Dec. 17, 1968  R. J. HAVENS  3,416,373
DISPLACEMENT DETECTOR
Filed April 1, 1966  4 Sheets-Sheet 1
SUBSTITUTE FOR MISSING XR
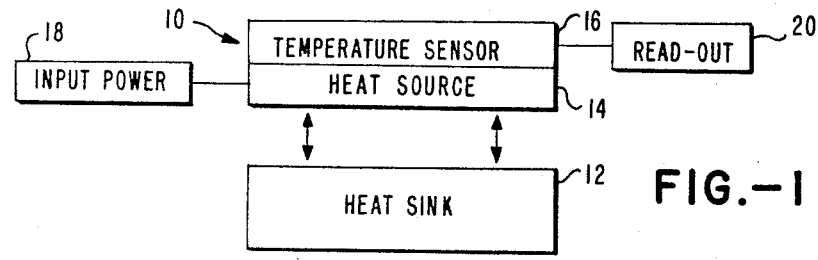
FIG.-1
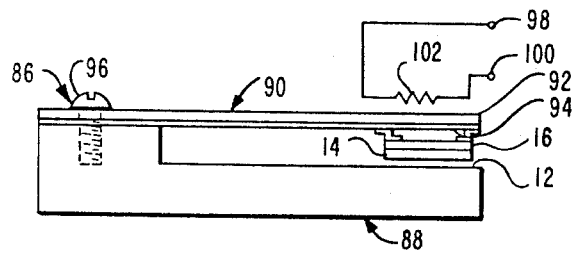
FIG.-14
FIG.-10
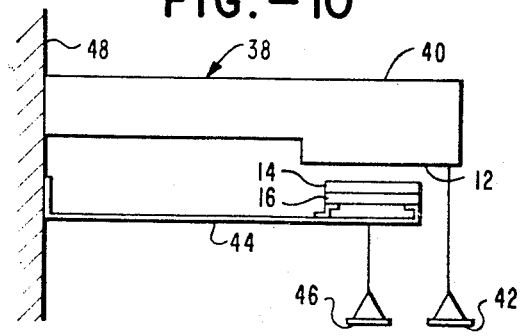
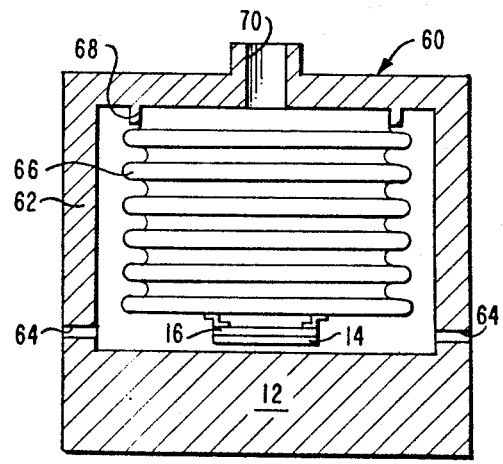
FIG.-12
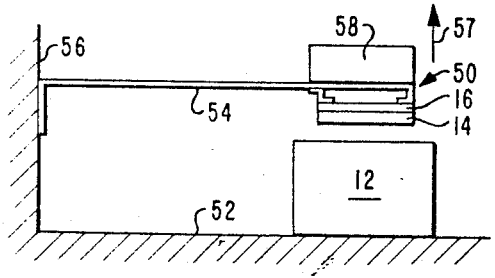
FIG.-11
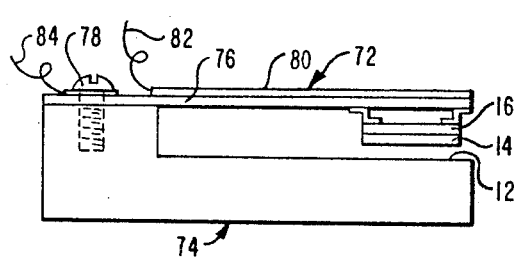
FIG.-13
INVENTOR.
RALPH J. HAVENS
BY *Fraser and Bogucki*
ATTORNEYS

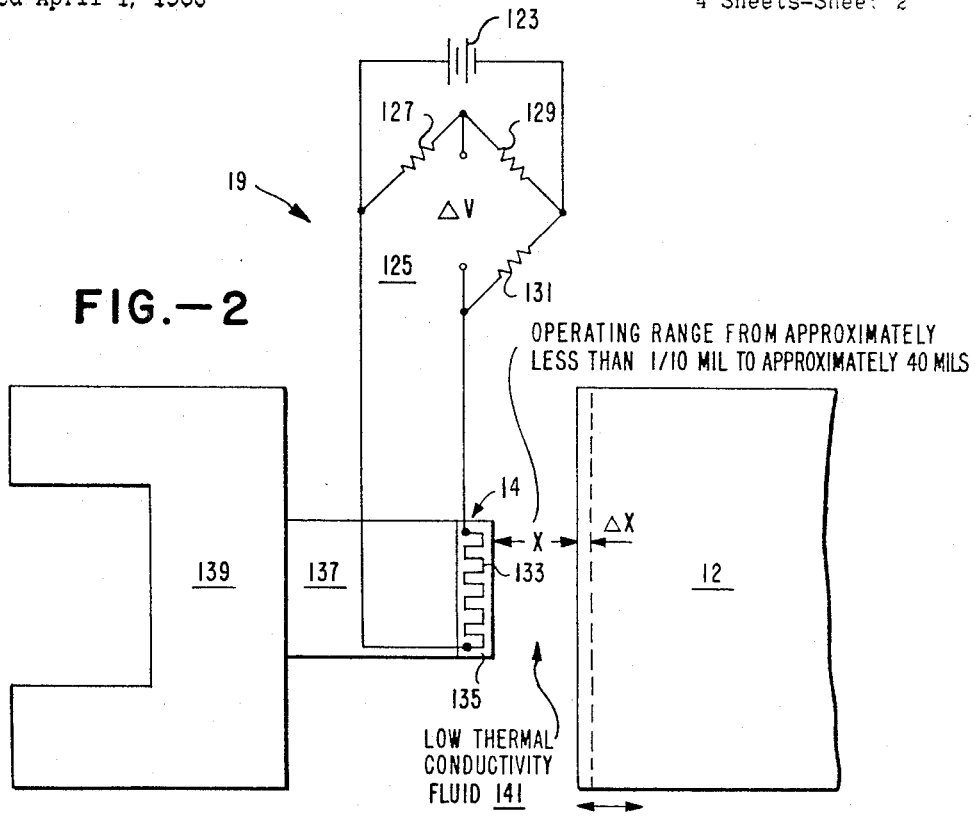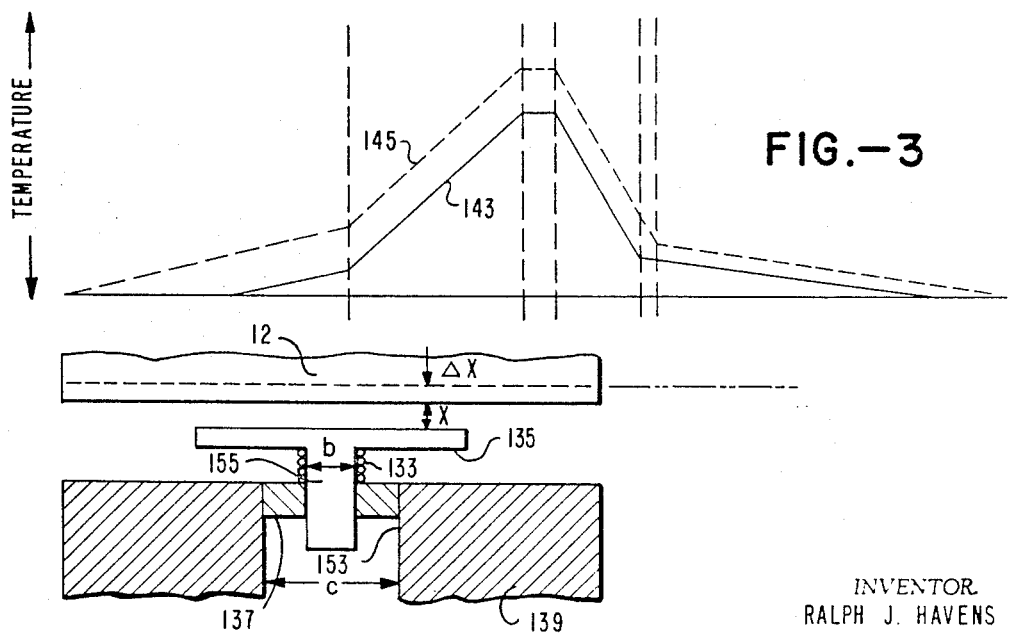

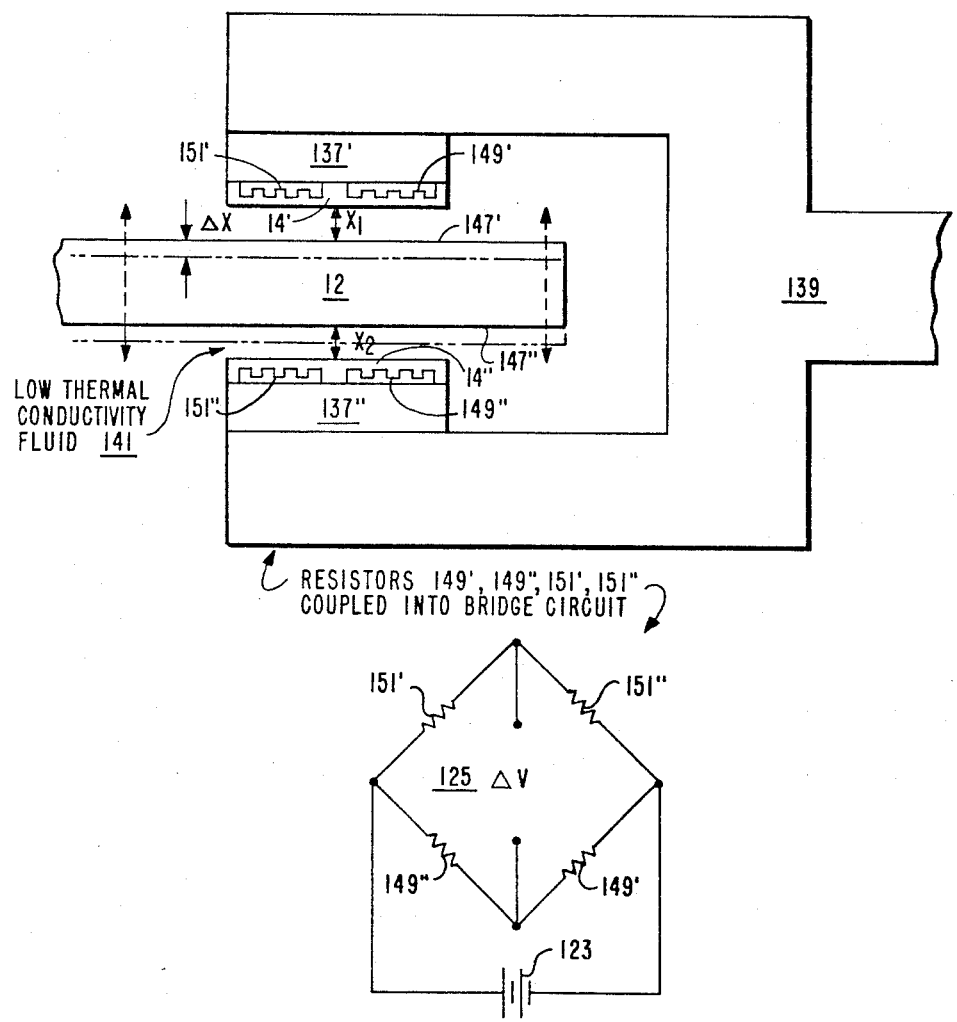
FIG.—4

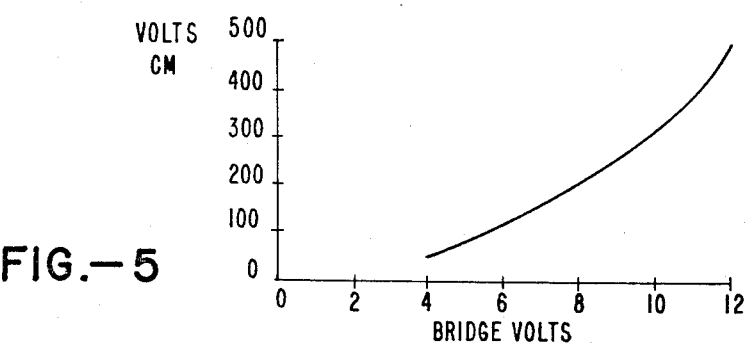
FIG.-5
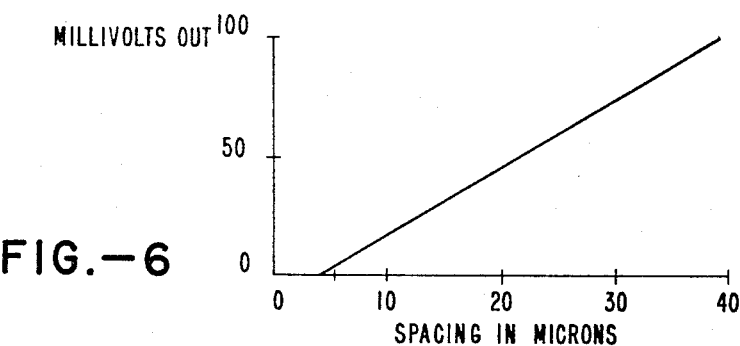
FIG.-6
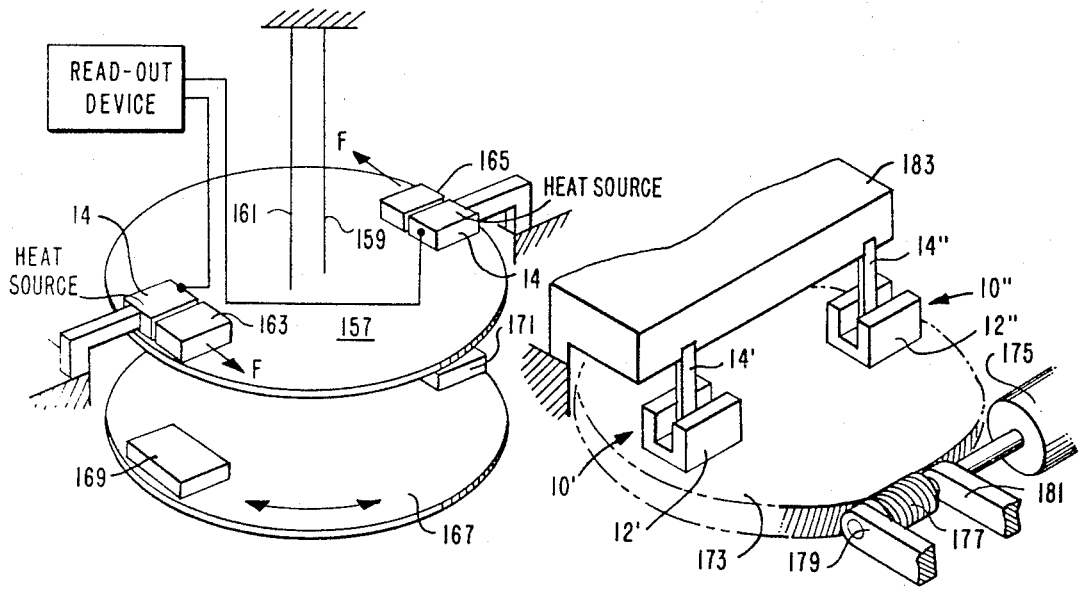
FIG.-8
FIG.-9

United States Patent Office 3,416,373
Patented Dec. 17, 1968

3,416,373
DISPLACEMENT DETECTOR
Ralph J. Havens, 11900 Susan Drive,
Granada Hills, Calif. 91344
Continuation-in-part of application Ser. No. 153,025,
Nov. 17, 1961. This application Apr. 1, 1966, Ser. No.
539,557
26 Claims. (Cl. 73—339)

ABSTRACT OF THE DISCLOSURE

Devices and systems for detecting displacement or relative displacements of extremely small magnitude comprise a pair of thermally conductive elements having opposed surfaces spaced apart by a small distance, e.g. 40 mils or less, occupied by a relatively low thermal conductivity fluid. One of the thermally conductive elements acts as a heat sink, and the second element is heated, so that heat is transferred between the second element and the first element through the low thermal conductivity volume. Temperature variations in the second element are sensed, and the thermal transfer characteristic is such that minute changes in the spacing between the elements result in relatively wide temperature swings in the temperature of the heat element employed as the heat source.

---

This application is a continuation-in-part of applicant's prior copending application, Ser. No. 153,025, filed Nov. 17, 1961, now abandoned.

This invention relates to instruments for measuring unknown quantities by the relative displacement of associated elements, and more particularly, to devices for measuring extremely minute relative displacements or changes of displacement.

The capability of precisely determining the displacement of one element relative to another is an essential for many sensing and measuring systems. Precision balances, pressure gauges, accelerometers, voltmeters, and many other instruments measure the extent of relative travel of a movable element in response to changes in the quantity or relationship under investigation. Mechanical linkages and other means are used to multiply the displacement, but the primary sensing element is generally mechanical, electrical or electromechanical. The sensing elements include a wide variety of electrical, magnetic, piezoelectric and other devices in addition to conventional spring bellows and other essentially mechanical arrangements.

The sensitivity of a displacement measurement device is critically dependent upon the type and nature of the sensing transducer employed. Extremely small displacements must often be measured, either to determine the displacements themeselves or to provide the basis for determination of the values of minute forces causing the displacements. For many applications it is highly desirable that the detector be a low force device, simply constructed but rugged enough for use in shock and vibration environment. Such characteristics are seldom encountered in combination in existing devices.

It is further highly desirable, from the standpoint of operation, for a displacement detector to provide an output signal which is high relative to the displacement involved. Most conventional instruments for measuring small displacements provide output signals of relatively small magnitude, and require more costly and complex amplification equipment.

It is therefore an object of this invention to provide improved instruments for measuring unknown quantities with greater sensitivity than instruments heretofore available.

It is a further object of this invention to provide an improved displacement detector.

It is another object of this invention to provide a displacement detector of relatively simple and inexpensive construction for providing accurate measurements of minute physical displacements.

It is yet another object of this invention to provide improved instruments for measuring relatively small perturbations resulting from changes in pressure, magnetic fields, electric fields, gravity and the like with relatively high sensitivity.

These and other objects are accomplished in accordance with the invention by a displacement detector utilizing heat transfer through a separating fluid between a relatively movable heat source and a heat sink. Changes in temperature of the heat source resulting from changes in relative displacement of the heat sink are utilized to generate relatively high amplitude output signal variations. The sensing transducer itself may comprise a thermally conductive planar heat source, supported in a thermally resistive mounting and movable toward or away from a thermally conductive heat sink disposed in opposed facing relation.

In accordance with more specific features of the invention, heat changes at the heat source are detected by disposing a thermally sensitive electrical element in heat exchanging relation with the heat source. The element is coupled into an electrical bridge uircuit, such that changes in the bridge circuit voltages are proportional to temperature changes at the heat source, which in turn are a measurement of displacement. The bridge circuit values may be selected to provide large voltage changes in the bridge circuit for minute relative displacements of the heat source and heat sink. Heat lost through the supporting structure from the heat source may be controlled by appropriate selection of the material and thickness of the supporting structure to provide a desired time constant relationship between displacement variations and temperature changes at the heat source.

In accordance with a further aspect of the invention, the detector configuration may minimize heat loss through the supporting structure. In one specific arrangement, the heat source is mounted within a ring-shaped supporting structure disposed in a cylindrical aperture in a conductive base, and heat loss through the supporting structure is reduced while still maintaining rigidity, so that the instrument can be used in rough environments.

In accordance with a further aspect of the invention, the effects of environmental temperature or power supply variation are minimized by a symmetrical arrangement of two jointly movable sensing elements relative to a single centrally disposed heat sink. The two sensing elements are coupled symmetrically into an electrical bridge circuit, such that changes in the heat sources or environmental temperatures are balanced out of the system. In one arrangement in accordance with the invention, each of a pair of heat sources is disposed on a different opposite side of a heat sink and each includes a different one of a pair of equally spaced-apart resistors coupled in a bridge circuit. Environmental or power source variations affect the bridge balance only slightly, but relative movement of the heat sink generates opposite but substantially equal variations in the resistive values, to provide a substantial output signal.

Devices and systems in accordance with the invention provide extremely high amplitude output signals of a linear nature in response to minute relative physical displacements. To this end, conversion of heat energy involving substantially no physical forces is efficiently utilized in effecting a change in electrical characteristics, with the heat energy transfer being determined by physical displacement. Consequently, the position of a body which is under examination, or the effects of a minute force resulting in a physical displacement, become highly significant in an electrical circuit, so that sensitive readings can be achieved without the extremely complicated equipment heretofore thought necessary. Physical displacements as low as $10^{-3}$ Angstrom units may be detected, limited only by Brownian motion above $10^{+3}$ Angstroms. Useful information can often be derived without need for precision power supply circuits or controlled environments. Where a cyclic variation is being studied, for example, only the frequency and the amplitude of the cyclic variation may be of interest, so that variations in the heat source system may be tolerated as long as they are of lower frequency. In accordance with other aspects of the invention, moreover, various arrangements may be utilized to insure adequate sensitivity without requiring the use of precision power supplies.

A better understanding of the invention may be had by consideration of the following description, when taken in connection with the accompanying drawings, in which:

FIG. 1 is a block diagram of a displacement detector in accordance with the invention;

FIG. 2 is a simplified diagrammatic view of a specific form of displacement detector in accordance with the invention;

FIG. 3 is a diagrammatic representation of heat distribution with the displacement detector of FIG. 2 arranged in alignment with FIG. 2;

FIG. 4 is a simplified diagrammatic view of a different displacement detector in accordance with the invention;

FIG. 5 is a graph of output sensitivity plotted with respect to bridge voltage for the detector of FIG. 4;

FIG. 6 is a graph of output voltage plotted with respect to displacement in the detector of FIG. 4;

FIG. 7 is a simplified diagrammatic view of a third displacement detector in accordance with the invention;

FIG. 8 is a simplified perspective view of the principal elements of a gravimeter system employing devices in accordance with the invention;

FIG. 9 is a simplified perspective view of the principal elements of a system for measuring rotational variations using devices in accordance with the invention;

FIG. 10 is a diagrammatic representation of a mircobalance in accordance with the invention;

FIG. 11 is a diagrammatic representation of an accelerometer in accordance with the invention;

FIG. 12 is a diagrammatic representation of a pressure gauge in accordance with the invention;

FIG. 13 is a diagrammatic representation of a voltmeter in accordance with the invention; and FIG. 14 is a diagrammatic representation of a wattmeter in accordance with the invention.

Referring now to the drawings, and particularly to FIG. 1, there is illustrated a displacement detector 10 according to the present invention which is constituted by a heat sink 12; a heat source 14 located adjacent the heat sink 12; a temperature sensor 16 for sensing changes in temperature of the heat source 14; a source 18 of input power for the heat source 14; and a read-out device 20 for displaying intelligence corresponding to the changes in temperature detected by the sensor 16.

The displacement detector 10 depends for operation upon the principle that the temperature of the constant power heat source 14 is closely sensitive to and a direction function of its distance from a closely adjacent heat sink, the momentary change in heat transfer therebetween causing a change in the heat source temperature until an equilibrium condition is established, the equilibrium heat source temperature being sensed by the sensor 16. Very precise and sensitive measurement of changes in the distance between the heat sink 12 and the heat source 14 are possible with the detector 10, particularly when the distance between the heat sink and heat source is initially made very small, since very small changes in distance have been found to produce large temperature changes in the heat source 14. The relation between the temperature (T) of the heat source 14 and the distance $(x)$ to the temperature $(T_0)$ of the heat sink 12 is given by:

$$xH = CA(T - T_0)$$

where

H = heat power (watts) of the heat source 14;
C = specific conductivity (watts/cm. deg.) of the medium between the heat source and heat sink;
A = area of heat source (sq. cms.); and
$x$ is less than 1 mm. and $x^2$ is small compared to A.

With present technology, the heat sink 12 and heat source 14 can be arranged so that the distance between them $(x)$ is less than $\frac{1}{10,000}$ of an inch, or $2.5(10^{-4})$ cm. However, assuming conservatively that $x = 10^{+2}$ cm. and a heat power (H) is selected such that $T - T_0 = 100°$ C., temperature changes as low as $10^{-6}°$ C. can be measured whereby changes in $x$ as low as $10^{+10}$ cm. can be measured. Thus, through the use of the heat source-sink phenomenon, the present detector 10 is extremely sensitive.

A fuller understanding of the operation of displacement detectors in accordance with this invention may be had by reference to FIGS. 2 and 3. FIG. 2 illustrates a particular arrangement of a detector 10, and FIG. 3 is a graphical illustration of the distribution of heat through the various elements of the detector of FIG. 2 before (solid line) and after (dotted line) a displacement Δx of the heat sink 12 relative to the heat source 14. Neither FIG. 2 nor FIG. 3 is drawn to scale, and it will be appreciated that the spacing between the heat sink 12 and heat source 14 is very much smaller than shown. For example, displacement detectors in accordance with the present invention are most suited for operation where the spacing is of the approximate order of 1 mil (one-thousandth of an inch). Smaller and greater spacings have also been employed, as shown by specific examples herein varying from ⅒ mil to 4 mils. The operating range for the spacing may usefully be extended from approximately ⅒ mil to approximately 1 mm. (40 mils), with useful readings being obtained. Substantial increase of the spacing beyond 1 mm., however, diminishes sensitivity and usefulness because of excessive heat transfer by convection away from the heat source. The source of input power 18 is shown as a battery 123 for illustrative purposes only, because any of the number of power sources may be used. A precision power source may be used, but is not required for some operations for reasons given below. The battery 123 provides power to a bridge circuit 125, the legs of which include resistors 127, 129 and 131 of substantially equal value and a fourth, temperature sensitive, resistor 133. The fourth resistor 133 is disposed in a planar element 135 of relatively high thermal conductivity material. The voltage variations appearing across the mid-terminals of the bridge circuit 125 are sensed by any suitable readout device such as a galvanometer, for relatively small changes in voltage, or a voltmeter, for relatively large changes.

The resistor 133 and the planar element 135 need only be disposed in close heat exchange relation, although as shown the resistor 133 is advantageously embedded in the element in a grid-like pattern. The element 135 combined with the resistor should have sufficient heat conduction to keep the temperature across the surface relatively uniform. Thin fiberglass plus a grid metal foil resistor, or insulated resistor wire bonded to a thin metal surface are adequate. The thickness of the planar element 135 may be chosen in accordance with the heat distribution and response times desired, relatively thick elements providing more uniform heat distribution but longer time constants. The resistor 133 may have any resistive value, but preferably is chosen to have a resistance approximating the resistance of the other resistors 127, 129 and 131 of the bridge circuit 125 for the range of normal operating temperatures. It will be understood that variable resistors may be used for balancing the bridge.

The heat source 14 is mounted on a supporting structure 137 of relatively low heat conductivity material, such as rubber or plastic. The supporting structure 137 in turn may be mounted on a movable element, although here it is coupled to a fixed base 139. A heat sink 12 of relatively high thermal conductivity material, such as aluminum, magnesium or another metal, is disposed with a planar surface in opposed facing relation to the element 135 and movable relative thereto in a direction substantially normal to the opposed, substantially parallel faces. Lower conductivity materials may suffice, but reduce the accuracy. The space between the opposed surfaces of the heat sink 12 and element 135 is occupied by a fluid 141 of relatively low thermal conductivity, air being suitable for most applications although water, kerosene and other commonly available gases and liquids may be used.

With any initial relative displacement ($x$) between the opposed surfaces of the heat source 14 and the heat sink 12, application of power to the bridge circuit 125 causes the fourth resistor 133 to generate heat. The resistor 133, as employed in the detector of FIG. 2, serves both as the heating element for the heat source 14 and as a sensor of the temperature changes which take place. If the source of input power cannot generate the temperature level desired, a separate heating resistor (not shown) connected to a power source may be disposed in heat exchange relation with the planar element 135. The heat generated by the resistor 133 is uniformly distributed throughout the conductive element 135 and is conducted into the associated environment, including the thermally resistive fluid 141 and the thermally resistive supporting structure 137. Some of the heat in the element 135 is lost by convection and radiation, but such losses are made insignificant by preservation of an adequately small spacing, $x$, substantially less than the lineal dimensions of the heat transfer surfaces that are involved. Heat from the element 135 continues to flow through the fluid 141 and the supporting structure 137 until a steady state is reached at which point the rate of heat flow through the fluid 141 is constant and may be expressed by the equation:

$$q = kA \frac{(T_{so} - T_{si})}{x} + KA \frac{(T_{so} - T_{su})}{d} \quad (1)$$

where $q$ is the steady state rate of heat flow through the fluid 141, $k$ is the specific thermal conductance of the fluid 141, A is the area of the material through which the heat is conducted (in this case, the area of the surface of the plate 135), $T_{so}$ is the temperature of the heat source 14, $T_{si}$ is the temperature of the heat sink 12, $x$ is the displacement between the heat source 14 and the heat sink 12, $T_{su}$ is the temperature of the heat sink for the support structure, K is the support structure specific thermal conductance, and $d$ is the support structure thickness.

The heat distribution throughout the detector of FIG. 2 in the initial steady state condition is shown by the solid line plot 143 in FIG. 3. It will be noted that the highest temperature exists at the heat source 14 and that the temperature drops off rapidly in the fluid 141 and in the supporting structure 137 with increased distance from the heat source 14. Because the specific thermal conductance of the fluid 141 is usually much less than the specific thermal conductance of the supporting structure 137 (a typical ratio being about 1:10), the thickness of the structure should be larger than the fluid thickness $x$, so that most of the heat loss is through the fluid.

If the heat sink 12 is displaced from the heat source 14 by an additional distance $\Delta x$, the pattern of heat flow in the detector changes until a new steady state is reached, as indicated by the dotted line plot 145 in FIG. 3. A true, fully stabilized steady state condition is of course not achieved because of the exponential characteristics of the heat transfer system. The conventional time constant term, $1/e$, is to be understood to be referred to hereafter when the expression "time constant" is employed. With the heat sink 12 separated from the heat source 14 by the additional distance $\Delta x$, the heat conducted away from the heat source 14 to the heat sink 12 is reduced, increasing the heat source temperature $T_{so}$.

When heat dissipation across the supporting structure stabilizes, the new steady state relationship is described by the equation (assuming heat loss through the support is relatively small):

$$q = kA \frac{(T_{so} + \Delta T_{so} - T_{si})}{x + \Delta x} \quad (2)$$

where $\Delta T_{so}$ is the change in temperature of the heat source 14 for the additional displacement $\Delta x$ of heat sink 12. Because $q$ remains relatively constant for varying displacements, the Equations 1 and 2 representing heat rate of flow before and after displacement may be equated:

$$q = kA \frac{(T_{so} - T_{si})}{x} = kA \frac{(T_{so} + \Delta T_{so} - T_{si})}{x + \Delta x}$$

and hence $$\Delta x = \frac{x \Delta T_{so}}{(T_{so} - T_{si})} \quad (3)$$

illustrating that the change in displacement $\Delta x$ is proportional to the change in heat source temperature $\Delta T_{so}$. It can be shown that $\Delta x$ is proportional to $\Delta T_{so}$ for small $\Delta x/x$ even when $$\frac{kA}{x} < \frac{kA}{d}$$

The heat sing temperature $T_{si}$ varies with fluctuations in the environmental temperature of the detector, and if measurements are taken over relatively long periods of time, the accuracy of the readings may be impaired. It has been found so that if $T_{so}$ is made about 100° C. hotter than $T_{si}$, the error will be a few percent or less. However, for small changes in displacement which may be measured within relatively short periods of time, the detector of FIG. 2 has been found to have sufficient accuracy for most purposes. For example, the eccentricity of a rotating member has been measured within a few Angstroms.

Various materials can be used for the temperature sensitive resistor 133, depending upon power and accuracy requirements. The materials may vary from platinum with a temperature coefficient of resistance of 0.0039 to typical thermistor material with a temperature coefficient of resistance of about 0.04. With the detector of FIG. 2 it has been found that:

$$\frac{\Delta R}{R} = a \Delta T_{so} \quad (4)$$

where R is the resistance of the resistor 133, $\Delta R$ is the corresponding change in the resistance of the resistor 133 for a change in heat source temperature $\Delta T_{so}$, and $a$ is the temperature coefficient of resistance of the resistor 133. If a resistor is used in which $a = 0.0039$ which is approximately $$a = \frac{1}{T_{so}}; \text{ then } \frac{\Delta R}{R} = \frac{\Delta T_{so}}{T_{so}} \quad (5)$$

As shown before (Equation 3 above):

$$\Delta x = \frac{x \Delta T_{so}}{(T_{so} - T_{si})}$$

Therefore, $$\Delta x = x \frac{\Delta R}{R} \frac{T_{so}}{(T_{so} - T_{si})} \quad (6)$$

If it is assumed that all of the heat generated by the resistor 133 dissipates through the thermal insulating fluid 141, then:

$$\Delta x = x \frac{\Delta R}{R} \frac{T_{so}}{(T_{so} - T_{si})} = 4x \frac{\Delta V}{V} \frac{T_{so}}{(T_{so} - T_{si})} \quad (7)$$

where V is the voltage of the battery 123 applied to the bridge circuit 125, and ΔV is the change in voltage appearing across the mid-terminals of the bridge circuit corresponding to a change ΔR in the resistance of the resistor 133.

If in the detector of FIG. 2, $x$ is 0.01 cm. and V is 10 volts, then:

$$\frac{\Delta V}{\Delta x}=\frac{V}{4x}\frac{T_{so}}{(T_{so}-T_{si})}=605 \frac{\text{volts}}{\text{cm.}} \qquad (8)$$

where $T_{so}$ and $T_{si}$ are in degrees Kelvin and the temperature difference $(T_{so}-T_{si})$ is approximately 100° C. It will be appreciated that with a detector response of 605 volts/cm., relatively small displacements may be accurately measured. If half of the heat is lost through the support structure, then the output voltage change, ΔV, is reduced by a factor of 2 for the same V and $T_{so}-T_{si}$, assuming A is reduced to one-half so that V and $T_{so}-T_{si}$ will be the same.

As mentioned above, the detector of FIG. 2 displays satisfactory accuracy when used to measure displacements occurring within a relatively short period of time, wherein variations in the environmental temperature are insignificant. However, when relatively slow displacements are to be measured, a detector such as that shown in FIG. 4 is preferred. The detector of FIG. 4 comprises a pair of identical heat source arrangements symmetrically arranged about the heat sink 12. The heat sources 14′, 14″ are mounted in parallel, spaced-apart relation by associated supporting structures 137′, 137″ affixed to the base 139. The heat sink 12 is disposed in the space between the heat sources 14′, 14″ with opposite parallel flat surfaces 147′, 147″ substantially parallel to the opposed surfaces of the heat sources 14′, 14″. The centrally disposed heat sink 12 is movable along an axis substantially normal to the surfaces of the heat sources 14′, 14″.

Pairs of thermally sensitive resistors 149′, 151′ and 149″, 151″ are disposed in heat exchange relation with the heat sources 14′, 14″ respectively. The resistors of each pair are spaced apart approximately equal distances, and all the resistors lie in planes substantially normal to the surfaces of the heat sources 14′, 14″. The resistors 149′, 151′ and 149″, 151″ are coupled by conductors (not shown) to be symmetrically arranged on opposite sides of the bridge circuit 125, represented in the lower half of FIG. 4. The heat sink 12 is separated from the heat sources 14′, 14″ by distances $x_1$, $x_2$ and is movable in opposite directions toward and away from the heat source, a displacement of Δ$x$ in the direction toward the heat source 14″ being shown in dotted outline in FIG. 4 for illustrative purposes.

With the bridge circuit 125 balanced, changes in environmental temperature result in corresponding changes in the resistive values in the pairs of resistors 149′, 151′ and 149″, 151″. The voltage across the mid-terminals of the bridge circuit 125 thus is substantially unchanged. Experiments performed have shown that a change in environmental temperature of 10° C. results in a displacement indication of 100 Angstroms. Therefore, if environmental temperature is controlled to within 0.1° C. over the duration of a measurement, an accuracy of within 1 Angstrom is achievable.

In actual practice a considerable amount of the heat generated at the heat source 14 of the displacement detector flows through the supporting structure 137′ and 137″ into the base 139, as shown previously in conjunction with FIG. 3. The amount of heat dissipated in the supporting structure depends on the relative thicknesses and thermal conductivities of the supporting structures 137′, 137″ and the fluid 141. For example, if the thickness of the supporting structure 137′ or 137″ is 10 times the distance $x$, and if the thermal conductivity of the the fluid 141 is 10 times smaller than the thermal conductivity of the material of the supporting structure, approximately half the heat generated at the heat source 14′ or 14″ flows to the heat sink 12 while the other half flows to the base 139. With half the heat dissipating through the supporting structure 137′ or 137″, the total rate of heat flow $q$ through the fluid 141 and support structure is double the rate in a detector having no heat loss through the supporting structure, and the voltage V of the source 123 is increased by a factor of $\sqrt{2}$. The overall sensitivity Δ$V$/Δ$x$ of the detector is therefore reduced by $\sqrt{2}/2$. Since the sensitivity is a function of the voltage V and the temperature difference $(T_{so}-T_{si})$, the bridge voltage necessary to give a desired temperature difference is expressed by the equation:

$$\frac{V^2}{R}=\frac{4kA}{x}(T_{so}-T_{si}) \qquad (9)$$

if it is assumed that half the heat generated at the heat source 14′ or 14″ dissipates through the supporting structure 137′ or 137″. A is the area of each side of the sensor, so that 2A is the area in contact with the fluid on the two sides. The other factor of 2 comes from the heat lost through the support structure. Equation 9 applies to the detector of FIG. 4 if it is assumed that $x_1=x_2$.

In a detector of the type shown in FIG. 4 wherein $x_1=x_2=$approximately ½ mil, the sensitivity in volts/cm. was measured for various different magnitudes of the voltage V applied to the bridge circuit, the results being represented graphically in FIG. 5. As shown in FIG. 5 the sensitivity increases as the applied voltage is increased, the increase of sensitivity per increment of increase in voltage becoming greater for higher values of the applied voltage. In another detector of the type shown in FIG. 4 wherein $x_1=x_2=$approximately 4 mils, the voltage applied to the bridge circuit was established at a constant magnitude, and changes ΔV in the voltage difference across the bridge circuit were measured for varying displacements of the heat sink 12, the results being shown in FIG. 6. The straight line plot of FIG. 6 illustrates that ΔV is proportional to Δ$x$ for reasonable changes in Δ$x$ under the stated conditions.

As mentioned, the percentage of heat at the heat source which dissipates through the supporting structure 137′ or 137″ depends upon the relative thickness and thermal conductivities of the supporting structure material and the fluid 141. Decreasing the heat losses through the supporting structure to provide increased sensitivity is desirable for some but not all applications. The heat loss in the supporting structure may also be used to establish a desired time constant for the detector. The time constant of a detector which is defined by $\tau=1/a$ where Δ$x \sim$Δ$T$, and Δ$T=$Δ$T_{max}(1-e^{-at})$, is expressed by the equation:

$$\tau=C/2K \qquad (10)$$

where K is the heat loss through the supporting structure and through the fluid in watts/cm.²° C. and C is the heat capacity per unit area for the supporting structure in joules/cm.³/° C.

Good plastic insulators typically have values of $$K=0.002/d \text{ watts/cm.° C.}$$

and $C=2d$ joules/cm.³/° C. where $d$ is the plastic thickness. Therefore, $t=500a^2$ and if $d=0.05$ cm., then $t=1.2$ seconds, if all the heat at the heat source is lost through the plastic. If the heat at the heat source is split with equal amounts traveling through the supporting structure 137′ or 137″ and the fluid 141, the heat dissipates twice as fast, and the time constant $t$ then becomes 0.6 seconds. Therefore, for applications of the detector where frequent measurements require a relatively low time constant, the material and thickness of the supporting structure 137′ and 137″ may be chosen to provide a suitable time constant and a corresponding reasonable accuracy.

For detector applications where the time constant is not critical and it is desirable to minimize heat loss through the supporting structure, detectors of other physical configurations may be used. One such detector is shown in FIG. 7. The base 139 has a cylindrical aperture 153 wherein a ring-shaped supporting structure 137 is mounted. A cylinder 155 of relatively high thermal conductivity material has an end joined to a planar heat source element 135, which may be fashioned in any shape but preferably is disc-shaped with its central axis coincident with the central axis of the cylinder 155, a portion of the cylinder opposite the element 135 being mounted within the ring-shaped supporting structure 137. The supporting structure 137 has uniform thickness and presents an equal width of material between the cylinder 155 and the base 139 about the entirety of the cylinder. A heat sensitive resistive element 133 is disposed in heat exchange relation with the cylinder 155 and element 135, preferably as a winding extending around a portion of the cylinder and adjacent the plate. The heat sink 12 is mounted adjacent the element 135 in a manner to permit movement along the central axis of the element 135 and the cylinder 155. Heat loss through the supporting structure 137 may be expressed by the equation:

$$q = K(T_{so} - T_{si}) \frac{2\pi l}{\log \frac{c}{b}} \quad (11)$$

where $q$ is the rate of heat loss, K the thermal conductance of the supporting structure, $l$ the thickness of the supporting structure, $c$ the diameter of the aperture 153, and $b$ the diameter of the cylinder 155. For approximately equal values of the specific conductivity of the supporting structure 137 and area of the sensor, it has been found that the heat loss through the supporting structure in the example of FIG. 7 is about ⅐ the loss in the example of FIG. 2 and FIG. 4.

As previously mentioned, the source of input power 18 need not be a precision power source to maintain reasonable accuracy. It has been found, for example, that the rate of drift or variation of a nonprecision power supply may be insignificant, as when measuring the amplitude and frequency of eccentricity of a rotating shaft. The use of a balance arrangement (FIG. 4 for example) also eliminates the need for a precision power supply in most applications.

The time constant of the detector can be modified by proper choice of the material and thickness of the supporting structure 137 and the fluid 141 in the manner disclosed. If, on the other hand, the power supply varies in repetitive fashion, and relatively rapidly, it may be useful to take detector readings in a phase-locked fashion, only when the heat source energization is at a selected level.

In instances where a non-precision power supply may tend to introduce significant error, other means may be used to compensate for greater accuracy. One arrangement for effecting the necessary compensation may employ some means of eliminating the effects of the fluctuations in the power signal. Because the absolute level of the temperature of the heat source is determined by the power energization level, as well as the relative displacement of the heat sink, the varying power signal may actually be taken as a reference and the variations compensated out.

It will be appreciated from the description relating to FIGS. 1 through 7 that the displacement detector of the present invention is uniquely suited to sense minute displacements with great sensitivity. Displacements representative of minute forces generated by a gas or a liquid pressure, or by magnetic gravitational or electric fields, for example, can be measured to indicate the magnitudes of the forces themselves. Because of their relative simplicity and extreme ruggedness, displacement detectors in accordance with the invention have great versatility and are amenable to use with a variety of different instruments.

FIG. 8 illustrates a gravimeter in accordance with the present invention which is capable of performing extremely sensitive measurements of forces such as the gravitational attraction between small masses. A torsional pendulum arrangement includes a first disk 157 suspended at its center by two filaments or wires 159, 161, here each 10 cm. long and 2.5 mm. apart. To 60 gm. weights 163, 165 are mounted on the first disk 157 with their centers of mass 8.5 cm. apart, and comprise heat sink elements having at least one planar surface. Each of a pair of heat sources 14 is fixedly mounted on stable reference means (not shown in detail) adjacent a different one of the weights 163, 165 to form displacement detectors in accordance with the invention. A second disk 167 having a central axis coincident with the central axis of the first disk 157 is rotatably mounted on a horizontal plane, spaced apart from the first disk 157. A pair of weights 169, 171 each weighing 172 gm. is mounted on the second disk 167, the centers of mass of the weights 163, 165 and the weights 169, 171, respectively, lying in parallel planes separated vertically by a distance of 1.7 cm. A displacement of the second disk causes a change in the position of the torsional pendulum due to a change in distance between the masses.

It will be understood that other suitable torsional pendulum arrangements could be used, such as a bar rather than the first disk 157 for mounting the weights 163, 165. Furthermore, the various dimensions of the arrangement of FIG. 8 as well as the weights thereof, refer to one particular successful arrangement constructed and tested, and are therefore intended to be by way of example only.

With the second disk 167 rotatably shifted to provide a displacement in the horizontal direction of 4.3 cm. between the weight pairs 163, 169 and 165, 171, a horizontal component of gravitational attraction F of approximately $2.8 \times 10^{-5}$ dynes (indicated by the arrows in FIG. 8) is exerted on each of the weights 163, 165. Each weight 163 or 165 is consequently displaced from its associated heat source 14 by approximately 650 Angstrom units. With the second disk 167 rotated or oscillated to provide displacements in both directions of 4.3 cm., a total displacement of approximately 1300 Angstrom units is detected. The forces involved are of the same order of magnitude as those generated by changes in the horizontal component of gravity. The gravimeter of FIG. 8, because of its extreme sensitivity to such minute forces, may be advantageously employed to measure, for example, the long term variations in the pull of the earth, small variations in the horizontal component of gravity, or the universal gravitational constant d.

A further example of the usefulness of the displacement detector arrangements in accordance with the present invention is shown in FIG. 9. FIG. 9 represents a practical system used to measure the rotational characteristics of an X-ray monochrometer subject to inaccuracies that were too small to detect by conventional testing but sufficiently large to seriously impair the accuracy of the instrument.

In the arrangement of FIG. 9, a monochrometer table 173 is rotated in microscopic steps by a stepping motor 175 through a fine lead screw 177 supported by fixed bearings 179, 181, each 2° rotation of the motor 175 producing a rotation of 1.0 second of arc of the table 173. A pair of U-shaped heat sinks 12′, 12″ are mounted on the table 173, and a pair of heat sources 14′, 14″ are mounted on the end of a fixed arm 183 with opposed planar surfaces of the heat sources and heat sinks being in heat exchange relation as previously described.

In the actual testing arrangement the displacement detectors were designed to produce a displacement of 1900 Angstrom units for each one second of rotational arc of the table 173. A number of tests were performed, with the displacements as measured by the detectors being charted for several revolutions of the screw 177. It was determined from these tests that the rotational error of the monochrometer was due to slight amounts of wear in the bearing arrangements 179, 181. The charted displacements indicated the exact nature and amount of the wear in each of the bearing arrangements, and from this data the bearing arrangements could be corrected.

For the displacement detector 10 to be a useful measuring device, there must be a restoring force to return the heat sink 12 and heat source 14 to their initial or null positions. Such a restoring force, as will be described in connection with FIGS. 10–14, may take various forms, but a simple spring is very effective and preferable for reliability. The term "spring" is broadly used herein and is intended to include any material or structure having resilience and adapted to mount the heat sink 12 or the heat source 14, as the case may be. Friction or low torque bearings can also be used, particularly where the restoring force is magnetic, electrical or gravitational.

A variety of different types of measuring instruments are adapted to utilize the displacement detector 10, reference next being made in this regard to FIG. 10 which illustrates a microbalance 38 constituted by a heavy or still cantilever arm 40 incorporating the heat sink 12 in its underface, and mounting a weighing pan 42. The microbalance 38 also includes a limber arm 44 which mounts a weighing pan 46, as well as the heat source 14 and the temperature sensor 16, the latter being shown diagrammatically for simplicity, without the usual leads to the input power 18 and to the readout 20. The inner extremities of both arms 40 and 44 are rigidly affixed in cantilever fashion to a vertical supporting structure 48, and both arms are characterized by a degree of resilience so that they tend to return to the positions illustrated in the absence of weights in the pans 42 or 46.

Assuming a bridge circuit (of FIG. 2) having a variable resistor and a galvanometer coupled between the mid-terminals of the bridge circuit is used in conjunction with the microbalance 38, the variable resistor is adjusted to give a zero reading on the galvanometer with both of the pans 42 and 46 empty. The unknown weight is then added to the weighing pan 46 which is attached to the limber arm 44, and known weights next added to the other pan 42 on the arm 40 until the galvanometer reading is zero. In this regard it will be apparent that the weight in the pan 46 deflects the limber arm 44, causing the heat source 14 to move away from the heat sink 12. Similarly, weight in the pan 42 deflects the stiff arm 40 so that the heat sink 12 moves toward the heat source 14. Therefore, assuming the stiff arm 40 is constructed and arranged to give a deflection of one-thousandth of the deflection experienced by the limber arm 44 for the same weight, one milligram in the pan 42 will balance one microgram in the pan 46. Any discrepancy in the balance can be precisely determined by reading the deflection of the galvanometer, as will be apparent. Moreover, the pan 46 can be utilized to contain the known or standard weights, and unknown weights applied to the stiff arm 40. Since the arm 40 deflects only one-thousandth that of the limber arm 44, this arrangement allows the apparatus to be used for weighing heavy trucks and the like.

The displacement detector 10 is also utilized as the sensing element of an accelerometer 50, as illustrated in FIG. 11. In this embodiment, the heat sink 12 rests upon a horizontal supporting surface 52, and the heat source 14 together with the temperature sensor 16 are mounted to the free end of a limber arm 54 which is secured in cantilever fashion to a vertical supporting surface 56. Assuming an acceleration of the apparatus, including the structures of surfaces 52 and 56, in the direction of the arrow 57, a predetermined mass 58 carried at the free extremity of the limber arm 54 will experience a displacement proportional to the magnitude of the acceleration. Therefore, sensing of the relative displacement between the heat sink 12 and the heat source 14, as by a circuit such as that of FIG. 2, will provide a measurement of the magnitude of such acceleration.

Any suitable damping force can be applied to the limber arm 54, if desired, as by a conventional dashpot arrangement, magnetic field, or the like (not shown) disposed in the path of movement of the limber arm 54. The showing of FIG. 11 may also be visualized as a magnetometer, in which case the predetermined mass 58 takes the form of a small permanent magnet, and any change in the magnetic field about the permanent magnet will be precisely determinable since it is proportional to the relative displacement between the heat sink 12 and the heat source 14 resulting from the change. With this arrangement an output of 1-volt per gauss is attainable with a relatively small permanent magnet.

FIG. 12 diagrammatically illustrated a pressure gauge 60 constituted to incorporate a displacement detector 10 according to the invention, the particular showing being quite simplified and not intended as an optimum configuration. The pressure gauge 60 includes a cylindrical housing 62 which is vented to atmosphere through a series of openings 64, the lower end of the housing 62 forming the heat sink 12. A cylindrical bellows 66 is disposed within the housing 62 with its upper, open extremity secured in fluid tight relation to a depending, annular flange 68 integral with the upper extremity of the housing 62.

The lower extremity of the bellows 66 is closed, and mounts the heat source 14 and the temperature sensor 16, the leads therefrom to the input power 18 and the readout 20 being omitted for simplicity.

Introduction of an unknown pressure $p_0$ through a suitable passage 70 in the upper portion of the housing 62 causes axial movement of the bellows 66, which moves the heat source 14 relative to the heat sink 12. The resultant change in distance therebetween is proportional to the magnitude of the pressure $p_0$ introduced within the interior of the bellows 66, and employment of a circuit such as that illustrated in FIG. 2 accordingly yields a precise indication of the unknown pressure $p_0$.

In the pressure gauge 60 illustrated, the value of $P_0$ is a function of the ambient pressure. If absolute pressure were desired, a compound bellows or the like responsive to both ambient and unknown pressures would be used, as will be obvious to those skilled in the art. Moreover, the principle disclosed in connection with the pressure gauge 60 is equally utilizable in connection with anemometers, flowmeters, air speed indicators, vacuum gauges, or similar devices.

FIG. 13 illustrates a device incorporating the displacement detector 10 and constituting a voltmeter 72, the comparatively large base 74 thereof forming the heat sink 12. A limber arm 76 is mounted to the base 74 in cantilever fashion by a screw 78, and the heat source 14 and temperature sensor 16 are mounted to the free extremity thereof.

The upper surface of the limber arm 76 is coated with a suitable electrostrictive ceramic 80 and a pair of leads 82 and 84 extend from the electrostrictive material 80 and from the screw 78 to the unknown voltage source to be measured. As will be apparent, voltage applied across the input leads 82 and 84 causes a deflection of the electrostrictive material 80, and consequently the limber arm 76. The deflection of the arm 76, which constitutes an electrostrictive reed, causes relative displacement between the heat sink 12 and the heat source 14 proportional to the magnitude of the voltage across the leads 82 and 84, and this voltage is precisely determinable by any suitable measuring means, such as by a circuit like that of FIG. 2, as will be obvious.

FIG. 14 illustrates a wattmeter 86 incorporating the present displacement detector 10, and including a base 88 incorporating the heat sink 12, and a limber arm 90 constituted by a pair of bimetallic strips 92 and 94. The arm 90 is mounted in cantilever fashion to the base 88 by a screw 96, and the heat source 14 and temperature sensor 16 are mounted to the free extremity of the arm 90 in close juxtaposition to the heat sink 12.

The unknown power or wattage to be measured is applied through a pair of leads 98 and 100 across a resistor 102, which is located immediately adjacent the bimetallic strips 92 and 94, and the resultant heating of the strips is, by reason of its proportionality to the magnitude of the wattage across the resistor 92, precisely indicative thereof. The extent of heating of the strips is translated, as is well known, into displacement thereof and consequent displacement of the heat sink 12 relative to the heat source 14. The extent of this latter displacement is measured by a bridge circuit (such as that of FIG. 2), and since the displacement is proportional to the wattage or input power applied across the leads 98 and 100, the readout can be in terms of watts.

Obviously, a variety of analogous devices can be visualized incorporating the displacement detector, and the exemplifications given are not to be construed as limiting the scope of the present invention. Moreover, the invention is not intended to be limited to a fixed power heat source because heat source variations may not be significant relative to the displacement under investigation, because the detector itself may be arranged to balance out such variations, and because power variations may be compensated for in other fashion. It is noted that in each of the forms described the heat source 14 is preferably mounted so as to be spaced from the associated structure over the greater area thereof to thereby minimize thermal transfer therebetween.

Although there have been described specific displacement detectors in accordance with the invention, it will be appreciated that the invention is not limited thereto. Accordingly, any and all modifications, variations or equivalent arrangements falling within the scope of the annexed claims should be considered to be a part of the invention.

What is claimed is:

1. In a displacement detector, the combination of:
   a heat sink;
   a heat source adjacent said heat sink, at least one of said heat sink and heat source being displaceable relative to the other; and
   means for sensing changes in temperature of said heat source comprising temperature sensing means carried by said heat source and responsive to changes in temperature thereof resulting from relative movement between said heat source and said heat sink to indicate the extent of said relative movement.

2. In a displacement detector, the combination of: a heat sink; a heat source adjacent said heat sink in predetermined spaced relationship therewith at least one of said heat sink and said heat source being movable relative to the other; means for sensing changes in temperature of said heat source to thereby detect relative displacements of said heat source and said heat sink from said predetermined spaced relationship; and means operative to effect relative displacement of said heat sink and said heat source and tending to restore said predetermined relationship.

3. In a displacement detector, the combination of: a pair of cantilever mounted arms; a heat sink carried by one of said arms; a heat source located adjacent said heat sink and carried by the other of said arms; and means for sensing changes in the temperature of said heat source to detect displacements of said heat sink and said heat source relative to each other.

4. The invention as set forth in claim 3 above, wherein one of said arms is relatively stiff and the other is relatively limber.

5. In a displacement detector, the combination of:
   a heat sink;
   a heat source adjacent said heat sink, said heat source and sink being subject to relative displacement, the distance of separation of said heat source and sink during measurements being less than about 40 mils;
   a low thermal conductivity medium disposed between said heat source and sink during measurements, said heat source including means for sensing changes in temperature of said heat source to thereby detect displacements of said heat sink and said heat source relative to each other.

6. In a displacement detector, the combination of:
   a heat sink;
   a heat source adjacent said heat sink and including a temperature sensor, said heat sink and heat source being subject to the relative displacement to be detected, the distance of separation of said heat source and sink during measurements being less than about 40 mils;
   a low thermal conductivity medium disposed between said heat source and sink during measurements;
   a read-out device connected to said temperature sensor; and
   a source of input power for providing constant level power to said heat source for heating thereof, said temperature sensor being adapted to sense temperature changes in said heat source and actuate said read-out device in response thereto.

7. The invention as set out in claim 6 above, wherein said heat source and temperature sensor comprise electrical resistance means.

8. The invention as set out in claim 6 above, wherein said heat source comprises a first electrical resistance means, and wherein said temperature sensor comprises a second electrical resistance means.

9. In a displacement detector, the combination of:
   a heat sink;
   a first electrical resistance means adjacent said heat sink and constituting a heat source, at least one of said heat sinks and heat source being relatively displaceable relative to the other, the distance of separation of said heat source and sink during measurements being less than about 40 mils;
   a low thermal conductivity medium disposed between said heat source and sink during measurements;
   a second electrical resistance means adjacent said first resistance means and constituting a temperature sensor; an electrical bridge connected to said temperature sensor, said temperature sensor being located in one branch of said bridge, said electrical bridge including a meter for indicating unbalance in the branches of said electrical bridge; and
   a source of input power connected to said heat source for heating thereof, said temperature sensor being adapted to sense temperature changes in said heat source and unbalance said electrical bridge in response thereto.

10. In a displacement detector, the combination of first and second elements of thermally conductive material, said first and second elements being relatively movable toward or away from each other, a fluid disposed between said first and second elements, a support structure of low thermal conductivity material supporting said first element, temperature sensitive means disposed in heat exchange relation with said first element, and means responsive to said temperature sensitive means for indicating displacements of the first and second elements.

11. A displacement detector comprising first and second thermally conductive elements having opposed surfaces spaced apart by a distance in the range from approximately 1/10 mil to approximately 40 mils, and being relatively movable in the direction normal to the opposed surfaces, a first of said elements comprising a heat sink, fluid means having relatively low thermal conductivity interposed between the opposed surfaces of said elements, means for thermally insulating said second element to provide heat transfer principally between said elements through said fluid means, means for heating said second element, and means for sensing temperature changes in said second element responsive to displacement variations between said elements.

12. The invention as set forth in claim 11 above, wherein the characteristics and geometry of said means for thermally insulating said second element are chosen to establish a predetermined heat transfer characteristic for heat lost from said second element, and a predetermined heat transfer characteristic between said elements to provide a predetermined detector time constant.

13. The invention as set forth in claim 12 above, wherein the rates of heat transfer between said elements and away from the opposing surfaces of said elements are selected to establish a substantially direct relation between the displacement of the opposing surfaces of said elements and variations in the temperature of said second element.

14. The invention as set forth in claim 12 above, wherein the detector time constant is arranged to be substantially less than the variation rate in the displacement of interest.

15. The invention as set forth in claim 12 above, wherein the detector time constant is arranged to be substantially less than the variation rates of the means for heating and the means for sensing.

16. In a displacement detector for detecting minute movements, the combination of a pair of relatively high thermal conductivity elements having flat opposed surfaces spaced apart by a substantially fixed distance, a third relatively high thermal conductivity element disposed between and having opposite flat surfaces substantially parallel to the flat surfaces of said pair of elements, said third element being movable along a predetermined axis substantially normal to the flat surfaces, a fluid of relatively low thermal conductivity disposed between said third element and each of said pair of elements, support means coupled to each of said pair of elements, and means coupled to both of said pair of elements for sensing temperature changes thereof in response to movement of said third element along the predetermined axis.

17. The invention as set forth in claim 16 above, wherein said third element comprises a heat sink, wherein said support means provide substantial thermal insulation of said pair of elements except from said heat sink, and wherein in addition heating means are coupled to said pair of elements.

18. The displacement detector of claim 16 wherein said sensing means comprises a pair of temperature sensitive resistor means disposed with each of said pairs of elements, circuit means coupling both pairs of resistor means in a symmetrical bridge circuit, means for supplying power to the bridge circuit, and means for detecting voltage differences in the bridge circuit to thereby detect relative motion of the third element to the pair of elements.

19. In a displacement detector, the combination of a pair of flat elements of relatively high thermal conductivity material substantially equal in size, support means having relatively low thermal conductivity supporting the pair of flat elements in parallel, spaced-apart relation, a third element of relatively high thermal conductivity having parallel flat surfaces on opposite sides thereof, said third element extending into the region between and having its opposite parallel surfaces parallel to the opposed surfaces of said pair of flat elements, said third element being movable along an axis mutually perpendicular to the opposed surfaces of the pair of flat elements, a fluid of relatively low thermal conductivity disposed between the third element and the opposed surfaces of the pair of flat elements, separate pairs of thermally sensitive resistors disposed in each element of said pair of flat elements, each pair of resistors in each element lying in a plane substantially normal to the opposed surfaces of the pair of flat elements and the first and second resistors in each pair being spaced apart a substantially equal distance, circuit means coupling the first and second resistors of the pair of elements into a balanced bridge circuit, the serial combinations of first resistors and second resistors of each pair of resistors comprising two parallel legs of the bridge circuit, means for supplying power to the bridge circuit, and means for measuring voltage differences across the parallel legs of the bridge circuit whereby displacements of said element relative to the pair of elements are detected.

20. The displacement detector of claim 19 wherein the spacing between said third element and each of said pair of elements is in the range from approximately 1/10 mil to approximately 40 mils, and substantially less than the lineal dimensions of the flat surfaces of the pair of elements.

21. In a displacement detector, the combination of a disk of relatively high thermal conductivity material having a central axis, a cylinder of relatively high thermal conductivity material having a central axis coincident with the central axis of the disk and having one end coupled to the disk, a ring of relatively low thermal conductivity material concentrically mounted on the outside of the cylinder, a first element of relatively high thermal conductivity material having a cylindrical aperture therein, said ring being mounted on the inside of said aperture, a second element of relatively high thermal conductivity material having a flat surface parallel to and adjacent the surface of said disk opposite said cylinder, said second element being movable relative to the disk along an axis coincident with the central axis of said disk, temperature sensitive resistor means disposed in heat exchange relation with said disk and said cylinder, a fluid of relatively low thermal conductivity disposed between said second element and said disk, and means for detecting resistance changes of the temperature sensitive resistor means whereby the relative displacements of the disk and the second element may be detected.

22. In a displacement detector, the combination of a first element of thermally conductive material, a second element of thermally conductive material having a portion joined to the first element, a third element of thermally conductive material having an aperture therein, an insulator mounting the second element within the aperture, said insulator presenting an equal width and thickness of thermally resistive material between the second element and the aperture around the entirety of the second element, a fourth element movable relative to the first element, thermally sensitive resistor means in heat exchange relation with the first and second elements, means for applying power to the resistor means, and means for measuring changes in the resistance of the resistor means whereby relative displacement of the first and fourth elements may be detected, the thickness, thermal characteristics and geometry of said insulator being chosen to establish a predetermined heat transfer loss characteristic from the first element and a predetermined heat transfer characteristic between the first and fourth elements to provide a predetermined detector time constant and wherein rates of heat transfer between the first and fourth elements and away from the first element are selected to establish a substantially direct relation between the displacement of the fourth element relative to the first element and temperature variations in the first element.

23. In a displacement detector, the combination of first and second elements of relatively high thermal conductivity material having flat surfaces disposed parallel to and adjacent each other, at least one of said first and second elements being movable along an axis normal to the flat surfaces, a fluid of relatively low thermal conductivity disposed between the flat surfaces of said first and second elements, a support structure of relatively low thermal conductivity joined to said first element, temperature sensitive resistor means disposed within said first element, a bridge circuit including a plurality of symmetrical legs, one of which includes the temperature sensitive resistor means, and voltage source means coupled to said bridge circuit, whereby relative displacements between the flat surfaces of said first and second elements appear as voltage differences across said bridge circuit.

24. The displacement detector of claim 23 wherein the spacing between the first and second elements is of the order of approximately one mil, and substantially less than the lineal dimensions of the flat surfaces of the first and second elements.

25. The displacement detector of claim 23 further including means for heating said first element comprising resistor means and means for passing current through said resistor means.

26. The displacement detector of claim 23 wherein the time constant of the circuit is chosen in accordance with the formula $$\tau = \frac{C}{2K}$$

where $\tau$ represents the conventional value for the time required for heat distribution in the support structure to reach within $1/e$ of a steady state following a change in temperature at said first element, $C$ represents the effective heat capacity per unit area in joules/cm.$^3$/° C. of the supporting structure, and $K$ represents heat loss through the supporting structure and the fluid in watts/cm./° C.

References Cited
UNITED STATES PATENTS

| | | | |
|---|---|---|---|
| 2,495,268 | 1/1950 | Leiphart | 73—362 XR |
| 2,509,593 | 5/1950 | Goddard | 250—36 |
| 2,558,190 | 6/1951 | Miller | 73—398 |
| 2,605,094 | 7/1952 | Hancock | 73—516 |
| 2,894,390 | 7/1959 | Talbot | 73—295 |
| 3,075,377 | 1/1963 | Lang | 73—15 |
| 3,138,023 | 6/1964 | Washburn | 73—295 |

LOUIS R. PRINCE, *Primary Examiner.*

FREDERICK SHOON, *Assistant Examiner.*

U.S. Cl. X.R.

73—190; 33—125

UNITED STATES PATENT OFFICE
CERTIFICATE OF CORRECTION

Patent No. 3,416,373

December 17, 1968

Ralph J. Havens

It is certified that error appears in the above identified patent and that said Letters Patent are hereby corrected as shown below:

Column 1, line 55, "themeselves" should read -- themselves --. Column 2, line 28, "uircuit" should read -- circuit --. Column 3, line 8, "10+3" should read -- $10^{-3}$ --; line 44, "mirco" should read -- micro --. Column 4, line 17, "x=$10^{+2}$" should read -- x=$10^{-2}$ --; line 18, "T-$T_o$ = 100° C." should read -- T-$T_o$ - 100° C. --; line 20, "$10^{+10}$" should read -- $10^{-10}$ --. Column 6, line 30, "$\frac{kA}{x} < \frac{kA}{d}$" should read -- $\frac{kA}{x} < \frac{KA}{d}$ --; line 33, "sing" should read -- sink --. Column 8, line 22, "$x_1 = x_2$" should read -- x = $x_1$ = ? --; line 62, "t = $500a^2$" should read -- t = $500d^2$ --. Column 10, line 50, "constantd" should read -- constant --. Column 12, line 14, "illustrated" should read -- illustrates --.

Signed and sealed this 7th day of April 1970.

(SEAL)
Attest:

EDWARD M. FLETCHER, JR.
Attesting Officer

WILLIAM E. SCHUYLER, JR.
Commissioner of Patents